United States Patent [19]
McWha

[11] Patent Number: 5,871,327
[45] Date of Patent: Feb. 16, 1999

[54] VEHICLE WHEEL HANDLING DEVICE

[76] Inventor: David McWha, 4 James Street, Newport-on-Tay, DD6 8BB, United Kingdom

[21] Appl. No.: 817,390
[22] PCT Filed: Oct. 23, 1995
[86] PCT No.: PCT/GB95/02483
  § 371 Date: Apr. 18, 1997
  § 102(e) Date: Apr. 18, 1997
[87] PCT Pub. No.: WO96/12639
  PCT Pub. Date: May 2, 1996

[30] Foreign Application Priority Data

Oct. 22, 1994 [GB] United Kingdom ............. 9421299

[51] Int. Cl.⁶ ........................................... B62D 43/00
[52] U.S. Cl. ................. 414/463; 414/466; 224/42.12; 224/42.21
[58] Field of Search ............... 414/463, 465, 414/466; 224/42.12, 42.18, 42.21

[56] References Cited

U.S. PATENT DOCUMENTS

| | | |
|---|---|---|
| 1,470,996 | 10/1923 | McKinley . |
| 1,780,044 | 10/1930 | Scholl . |
| 1,983,767 | 12/1934 | Mueller ................................. 414/463 |
| 2,063,598 | 12/1936 | Franklin ............................... 414/463 |
| 3,390,864 | 7/1968 | Searcy et al. ......................... 414/463 |
| 3,712,586 | 1/1973 | Nicholson . |
| 3,845,891 | 11/1974 | Becher ................................. 414/465 |
| 4,548,540 | 10/1985 | Renfro ................................. 414/463 |
| 5,297,913 | 3/1994 | Au ........................................ 414/463 |
| 5,531,558 | 7/1996 | Ruescher ............................. 414/463 |

FOREIGN PATENT DOCUMENTS

| | | |
|---|---|---|
| 655000 | 12/1928 | France ................................. 414/463 |
| 2586992 | 3/1987 | France . |
| 58-170 674 | 10/1983 | Japan . |
| 2 274 674 | 11/1990 | Japan . |
| 2155421 | 9/1985 | United Kingdom . |

Primary Examiner—Karen M. Young
Assistant Examiner—Douglas Hess

[57] ABSTRACT

A vehicle wheel handling device for assisting in the mounting or demounting of a vehicle wheel onto or from the spare wheel storage position of a vehicle, comprises a wheel support mechanism for supporting the wheel, a coupling mechanism for coupling the device to the vehicle, and a handle for allowing manual operation of the device. The coupling mechanism and handle are connected to the wheel support mechanism and the device is configured such that raising or lowering the handle causes raising or lowering of a wheel supported on the wheel support mechanism. The configuration of the device is preferably such that the wheel pivots about a horizontal axis during mounting or demounting so that a mechanical advantage is obtained, greatly facilitating the handling of heavy vehicle wheels.

38 Claims, 8 Drawing Sheets

VEHICLE WHEEL HANDLING DEVICE

The present invention relates to a vehicle wheel handling device and especially but not exclusively to a device for assisting in the mounting and demounting of a vehicle wheel from the external spare wheel mounting of an off road vehicle or from a spare wheel storage position inside a car. In this context the word "wheel" refers to a wheel and the tire fitted thereto.

It is convenient for any person driving a particular vehicle to be able to change a wheel in the event of a puncture. However, vehicle wheels for use on, for example, off road vehicles may be heavy and difficult to handle. In particular, difficulty may be experienced in demounting such a wheel from a typical mounting point on, for example, the outside of the rearmost door of an off road vehicle. Still more difficulty may be experienced in attempting to mount the replaced, and possibly wet and muddy, wheel onto the mounting point. A wheel may drop from the mounting point and may bounce or roll away, or injure the person handling it. Similar problems may occur in the removing or replacing of a wheel which is stored in the boot or under the bonnet of a car.

According to a first aspect of the present invention there is provided a vehicle wheel handling device for assisting in the mounting or demounting of a vehicle wheel onto or from the spare wheel storage position of a vehicle, comprising wheel support means for supporting the wheel, coupling means for coupling said device to said vehicle and handle means for allowing manual operation of said device, wherein said coupling means and said handle means are connected to said wheel support means and said device is configured such that raising or lowering of said handle means causes raising or lowering of a wheel supported on said wheel support means.

Preferably, said wheel support means supports the wheel to permit pivoting of the wheel between a mounted position and a demounted position.

Preferably, said pivoting is effected by raising or lowering of said handle means.

Preferably, said wheel support means comprises an elongate flexible wheel support member.

Preferably, during at least part of the raising or lowering of a wheel, said device is adapted to cause pivoting of the wheel about a substantially horizontal axis.

Said pivoting may be such that for at least part of the pivoting a first outer part of the wheel remains substantially vertically fixed, whilst a diametrically opposed outer part of the wheel is vertically displaced by a distance substantially equal to the diameter of the wheel.

Preferably, said wheel is caused to pivot through an angle greater than 90 degrees between said mounted position and said demounted position. This angle may be substantially 180 degrees, or even greater than 180 degrees, Preferably, said handle means includes a plurality of handles.

Preferably, said handles are spaced apart along the length of said wheel support member.

Preferably, the device is configured such that consecutive operation of said plurality of handles causes said pivoting of the wheel.

Preferably, said wheel support member is adapted to wrap around the wheel upon said pivoting of said wheel.

Preferably, said coupling means is adapted to couple said device to said vehicle via at least one wheel engaging member provided on a spare wheel mounting point of said vehicle.

Preferably, said device includes retaining means for retaining a wheel in contact with said device.

According to a second aspect of the present invention there is provided a vehicle wheel handling device comprising an elongate lever portion and a wheel supporting portion inclined with respect to said lever portion, the elongate lever portion having a first end further from the wheel supporting portion and a second end closer to the wheel supporting portion; and a pivot member adjacent the second end of the lever portion and adjacent said wheel supporting portion, said pivot member providing a pivot point about which said elongate member may rotate, enabling raising or lowering of the wheel supporting portion by respective lowering or raising of the first end of the lever portion.

Preferably, said pivot member comprises an arcuate member coupled at a first end to said lever portion and at a second end to said wheel supporting portion.

Preferably, said lever portion includes a socket member for tightening or loosening wheel nuts.

Said lever portion may be detachable from said wheel supporting portion and/or said pivot member.

Preferably, said lever portion is hingedly attached to said wheel supporting portion and/or said pivot member.

Preferably, said wheel supporting portion is adapted to provide an effective means of forcing the lever portion so as to loosen a wheel nut using the socket member, but not to provide an effective means of forcing the lever portion so as to tighten a wheel nut using the socket member.

Embodiments of the invention will now be described, by way of example, with reference to the accompanying drawings in which:

FIG. 7b is a plan view of an element of the embodiment of FIG. 7a.

With reference to FIGS. 1 to 4b, an embodiment of a vehicle wheel handling device according to the first aspect of the present invention comprises a flexible harness 1 adapted to be coupled to the horizontal wheel mounting studs 25,26 of a spare wheel mounting bracket on the outside of a vehicle by respective coupling means in the form of first and second attachment members 4A, 4B each comprising a flat metal member provided with an aperture and being adapted to slide onto respective wheel mounting studs 25,26.

Figure 1:
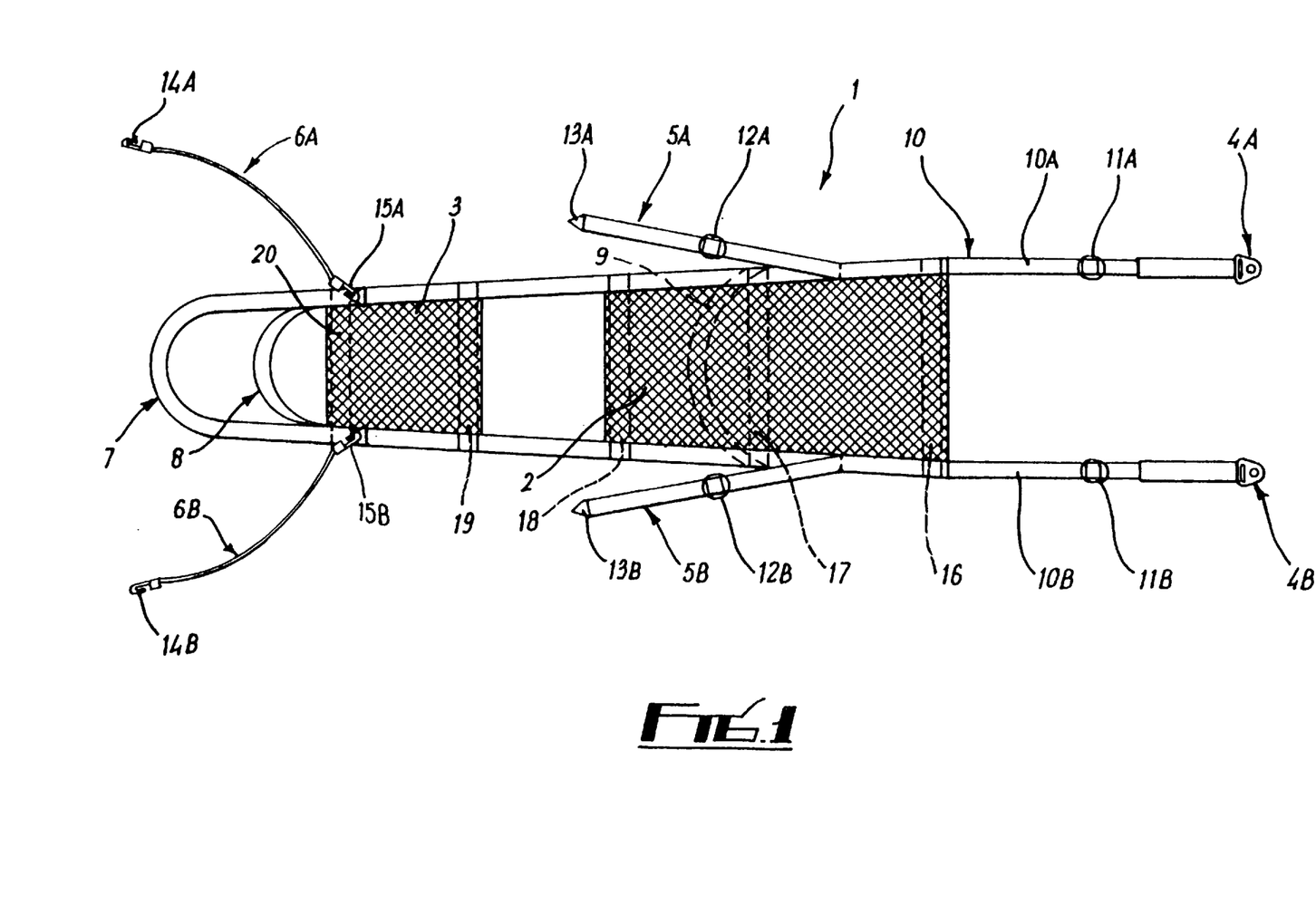
FIG. 1 is a plan view of an embodiment of a vehicle wheel handling device according to the first aspect of the present invention.

The harness 1 comprises a wheel supporting member in the form of an elongate flexible strap 10 made from, for example, a woven plastics material and having a first strap portion 10A connected at its first end to the first attachment member 4A and a second strap portion 10B connected at its first end to the second attachment member 4B. The first strap portion 10A and second strap portion 10B meet at their respective second ends to form an arcuate portion which forms a first handle portion 7.

The first strap portion 10A and second strap portion 10B include respective length adjustment and tensioning devices 11A, 11B. The first strap portion 10A and second strap portion 10B are attached to each other by first, second and third substantially parallel reinforcing members 16, 17, 18 which are attached to and support a first cover panel 2, and also by fourth and fifth substantially parallel reinforcing members 19, 20 which are attached to and support a second cover panel 3. The five reinforcing members 16, 17, 18, 19, 20 are spaced apart along the lengths of the first and second strap portions 10A, 10B, and may be made of the same type of material as the strap portions 10A, 10B. The first cover panel 2 and second cover panel 3 are made from a flexible woven plastics material.

A second handle portion 8 is connected to the fifth reinforcing member 20. A third handle portion 9 is connected to the second reinforcing member 17. The respective reinforcing members 20, 17 help to couple said second and third handle portions 8, 9 to the first and second strap portions 10A, 10B.

First and second restraining straps 5A, 6A are attached by their respective first ends to the first strap portion 10A. The first and second restraining straps 5A, 6A are adapted to be connected together by fastenings 13A, 14A attached to their respective second ends, and are adapted to restrain a wheel 28 in contact with the first strap portion 10A. The first restraining strap 5A includes a length adjustment and tensioning device 12A and is permanently attached to the first strap portion 10A. The second restraining strap 6A is attached to the first strap portion 10A by a hook and eye arrangement 15A.

In a similar manner two further restraining straps 5B, 6B are attached to the second strap portion 10B. Elements of the two further restraining straps 5B, 6B which correspond to the first and second restraining straps 5A, 6A are designated by corresponding reference numerals but suffixed by a B rather than an A.

Figure 2A:
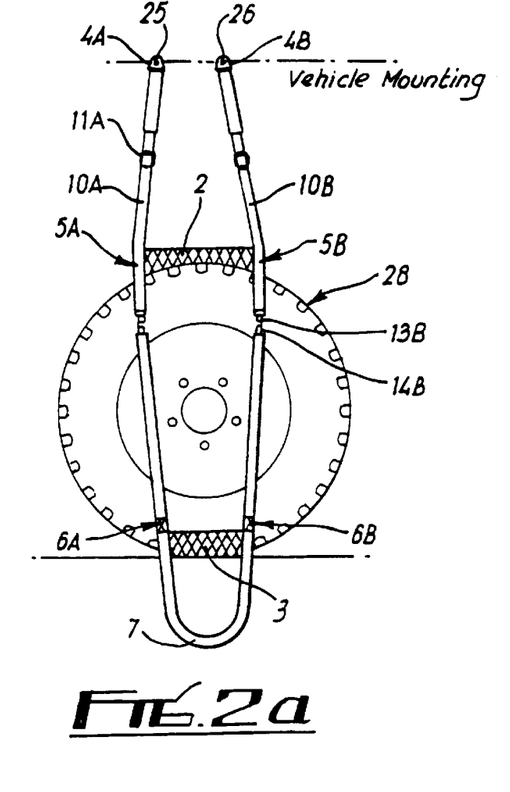
FIG. 2a and FIG. 2b are front and side views, respectively, of the wheel handling device of FIG. 1 with a wheel in a fully demounted position.
Figure 2B:
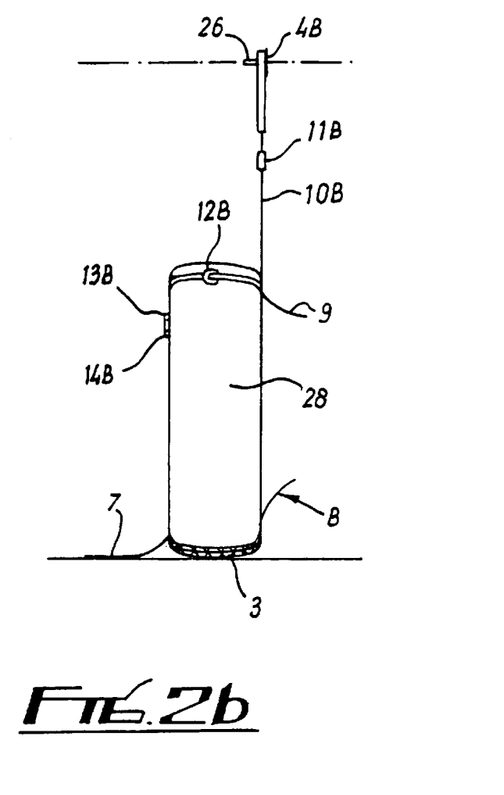

In use, to mount a wheel on the spare wheel mounting bracket, the first and second attachment members 4A, 4B are attached to the wheel mounting studs 25, 26 of a spare wheel mounting bracket, mounted, for example externally on the rear of an off road vehicle, by sliding the apertures provided in the attachment members 4A, 4B over the studs 25, 26. The harness 1 is then allowed to hang from the studs 25, 26 and the length adjustment and tensioning devices 11A, 11B are adjusted so that the second cover panel 3 rests substantially horizontally on the ground, but so that the first cover panel 2 and the parts of the first and second strap portions 10A, 10B between the first and second cover panels 2, 3 hang substantially vertically. A wheel 28, to be mounted on the studs 25, 26 is then placed so that it stands vertically upon the second cover panel 3. The two pairs of restraining straps 5A, 5B and 6A, 6B are then placed around the wheel 28, attached in their respective pairs by the fastenings 13A, 14A, 13B, 14B and tightened, so as to secure the wheel in position, using the length adjustment and tensioning devices 12A, 12B. Some or all of the lengths of the restraining straps 5A, 5B, 6A, 6B may be of an elastic material in order to help secure the wheel. The wheel 28 is now securely fastened into the harness 1 but still resting upon the ground, as illustrated in FIG. 2a and FIG. 2b.

Figure 3A:
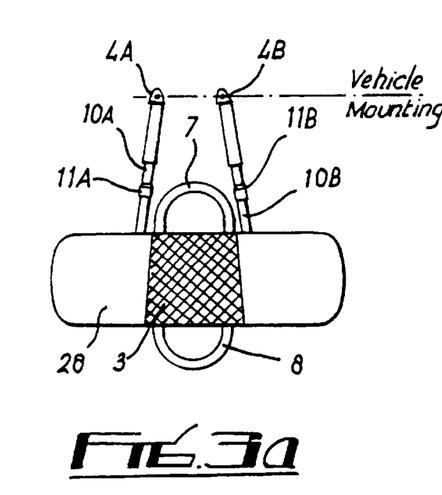
FIG. 3a and FIG. 3b are front and side views, respectively, of the wheel handling device of FIG. 1 with a wheel at a position intermediate a demounted position and a mounted position.
Figure 3B:
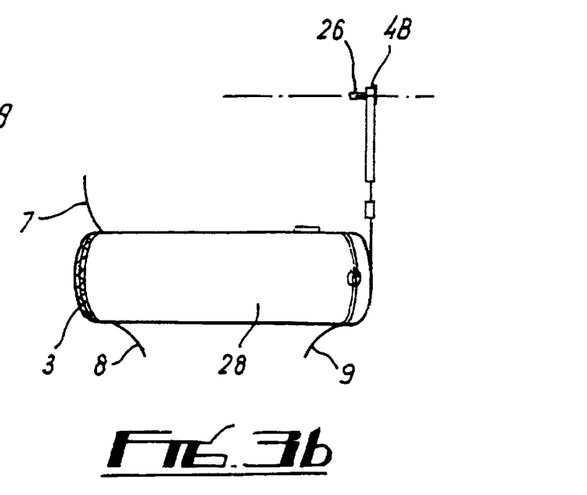

In order to raise the wheel 28 the first handle 7 is lifted. This lifts the wheel 28 without undue effort since a substantial amount of the weight of the wheel is supported by the vehicle via the studs 25, 26 and coupling members 4A, 4B. Lifting of the wheel 28 into a position between the ground and the mounting studs 25, 26 is therefore greatly facilitated. FIG. 3a and FIG. 3b illustrate a vehicle wheel 28 and harness 1 in such an intermediate position.

It will be appreciated that the centre of gravity of the wheel 28 is raised by only half of the diameter of the wheel, whilst the first handle 7 is raised by a distance equal to the full diameter of the wheel. The pivoting which occurs while the wheel is being raised, about the point where the wheel is supported by the harness, provides the mechanical advantage which facilitates raising of the wheel.

Figure 4A:
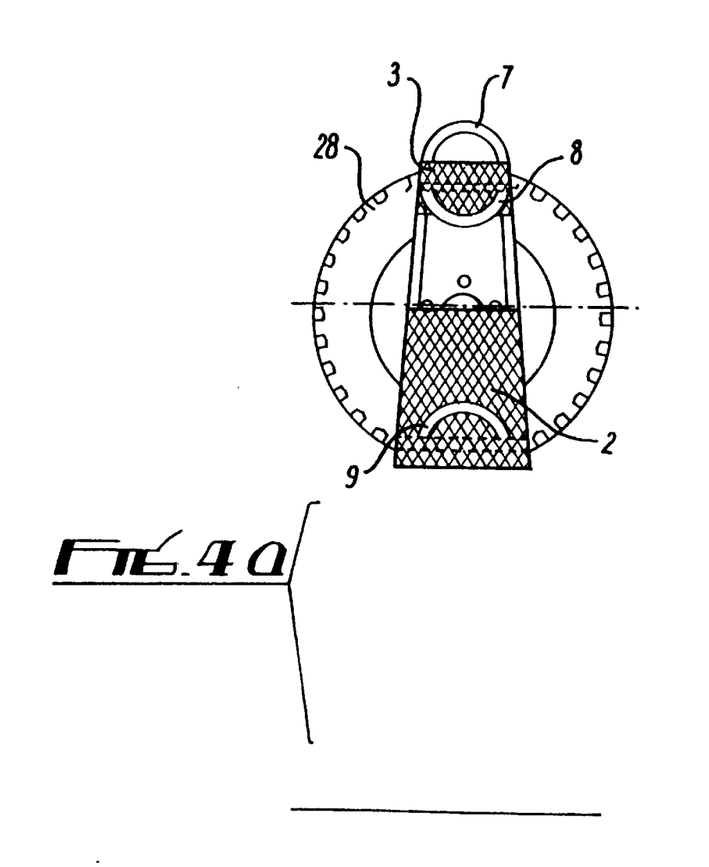
FIG. 4a and FIG. 4b are front and side views, respectively, of the wheel handling device of FIGS. 1 with a wheel in a mounted position.
Figure 4B:
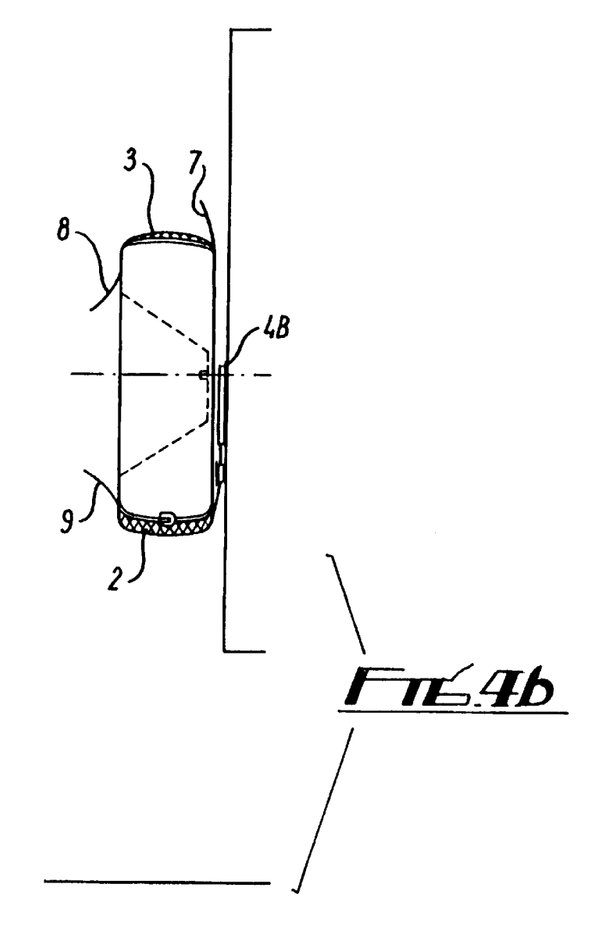

From this intermediate, horizontal, position the wheel 28 can be lifted further by raising the second handle 8. By using said second handle 8, and releasing the first handle 7 the wheel 28 may easily be lifted into a vertical position close to the studs 25, 26 upon which the wheel 28 is to be mounted. Once the wheel 28 is substantially vertical close to the studs 25, 26 the third handle 9 may be used, and the wheel may be manoeuvred and slid onto the studs by use of the second 8 and third 9 handles together. The position of the wheel 28 once mounted on the studs 25, 26 is illustrated in FIG. 4a and FIG. 4b. The wheel 28 may be secured on the studs in the normal way, and this will also secure the harness 1, on the studs 25, 26 between the wheel and the vehicle.

It will be noticed that tightening of the restraining straps 5A, 5B, 6A, 6B around the wheel 28 effectively wraps the second cover panel 3 around a first part of the tread area of the wheel. Furthermore, lifting of the wheel onto the vehicle using the handles 7, 8, 9 causes pivoting of the wheel and effectively wraps the first cover panel 2 around a second, diametrically opposed, part of the tread area of the wheel 28. The wheel 28 may therefore be lifted onto the vehicle using the handles 7, 8, 9, with the cover panels 2, 3 protecting the user from the possibly dirty parts of the wheel which are closest to the handles 7, 8, 9. It is also envisaged that at least one of the cover panels 2, 3 includes a pocket (not shown) which would be used to store gloves and/or tools which would be useful in the changing of a vehicle wheel.

Removal of a spare wheel 28 from, for example, a spare wheel mounting on the back of a vehicle is greatly facilitated by use of a harness which has been fitted into position as described above. The nuts securing the wheel 28 to the studs 25, 26 of the mounting are removed and the wheel 28 is then pulled off the studs using the second and third handles 8, 9. The third handle 9 is released and the second handle 8 lowered thus lowering the wheel 28 into a horizontal, intermediate, position (illustrated in FIG. 3a and FIG. 3b). The first handle 7 is then held and the second handle 8 released, allowing the wheel 28 to be lowered into the fully demounted position (FIG. 2a and FIG. 2b) by lowering of the first handle 7. The fastenings 13A, 13B, 14A, 14B of the restraining straps 5A, 6A, 5B, 6B are then undone allowing the wheel to be removed from the harness 1. A damaged wheel which is to be replaced may then be rolled onto the harness 1, secured, and lifted onto the wheel mounting as described above.

Figure 5A:
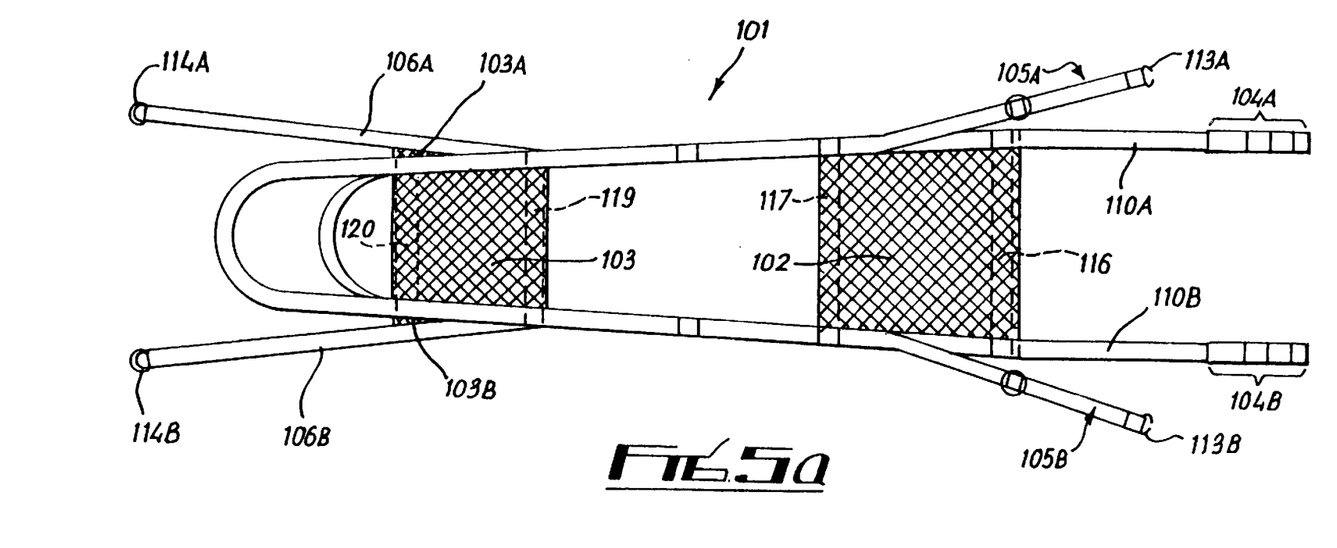
FIG. 5a is a plan view of a variation of the embodiment of FIG. 1.

FIG. 5a is a plan view of a harness 101 which is a variant of the embodiment of FIG. 1. The design and mode of use of the variant shown in FIG. 5a have many features in common with the embodiment of FIG. 1 and those features will not be described. The features of the variant which differ from the embodiment of FIG. 1 include the coupling means which is in the form of a first plurality of sewn loops 104A in a first strap portion 110A and a second plurality of sewn loops 104B in a second strap portion 110B (rather than the first and second attachment members 4A, 4B in the embodiment of FIG. 1). The coupling means in this form are adapted to be coupled to the vehicle via a mounting specifically adapted to receive the coupling means, rather than to be coupled to the wheel mounting studs. Such a mounting is shown in FIG. 5a and will be described hereafter. It should also be noted that it is not always necessary to mount the harness to two mounting studs. Where appropriate the harness may be coupled to the vehicle by just one stud.

The variant of FIG. 5a is provided with first and second restraining straps 105A, 106A attached to the first strap portion 110A and first and second restraining straps 105B, 106B attached to the second strap portion 110B, and said restraining straps 105A, 105B, 106A, 106B serve the same function as the restraining straps 5A, 5B, 6A, 6B of the embodiment of FIG. 1. The first restraining straps 105A, 105B are shown extending in the opposite direction to the first restraining straps 5A, 5B of the embodiment of FIG. 1. Since the first restraining straps 5A, 5B, 105A, 105B of both embodiments are flexibly attached to the rest of their respective harnesses this is a difference in representation rather than in the embodiments. The representation of FIG. 5a, however, shows the first restraining straps in a position more suitable for receiving a vehicle wheel (not shown), and may be provided with fixing means (not shown) for releasably fixing them in this or a similar position relative to the rest of the harness 101 in order to maintain their positioning immediately prior to their fixing around a vehicle wheel.

The harness 101 of FIG. 5a includes four reinforcing members 116, 117, 119 and 120 at least one of which may include a stiffening member (not shown) in order to help maintain the form of the harness 101 during and around the time of use.

The second restraining straps 106A, 106B of the harness 101 of FIG. 5a are permanently attached to the first and second strap portions 110A, 110B, for example by sewing (unlike the corresponding second restraining straps 6A, 6B of the harness 1 of FIG. 1).

The second restraining straps 106A, 106B are provided with fastenings in the form of first and second D-rings 114A, 114B which are adapted to attach to fastenings in the form of first and second clips 113A, 113B on the first restraining straps 105A, 105B in order to retain a wheel (not shown).

The harness 101 of FIG. 5a includes first and second cover panels 102, 103 and the second cover panel 103 includes a first portion 103A which extends between the first strap portion 110A and the corresponding second restraining strap 106A and a second portion 103B which extends between the second strap portion 110B and the corresponding second restraining strap 106B.

Features of the harness 101 of FIG. 5a may be incorporated into the harness of FIG. 1 and vice versa.

Figure 5B:
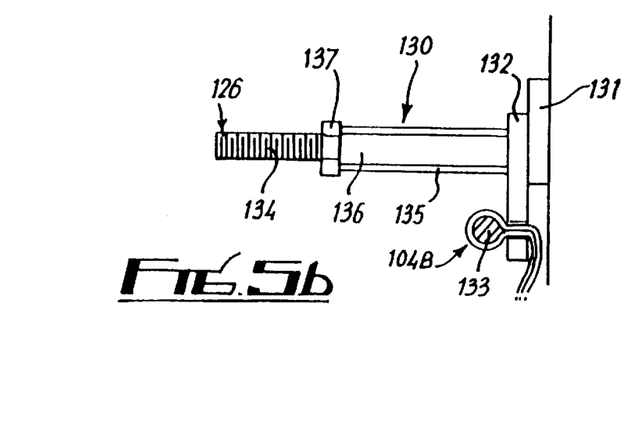
FIG. 5b is a partial cross sectional side view of the means for mounting of the embodiment of FIG. 5a on a vehicle.
Figure 5C:
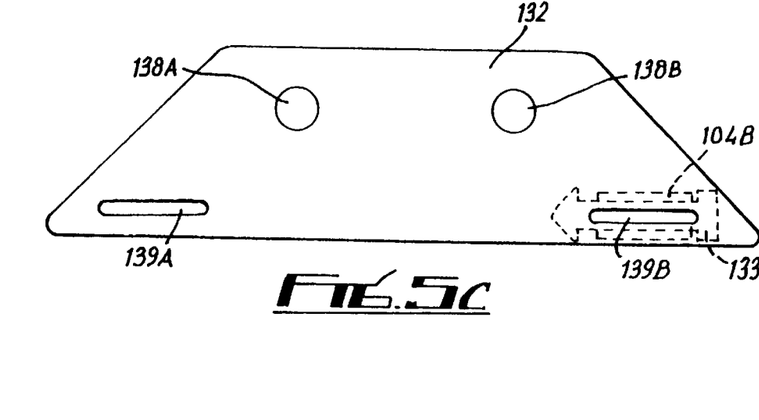
FIG. 5c is a front view of a detail of FIG. 5b.
Figure 6A:
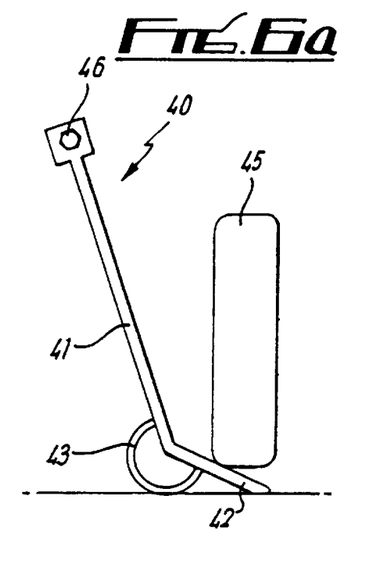
FIG. 6a, FIG. 6b and FIG. 6c are side views of an embodiment of a vehicle wheel handling device according to the second aspect of the present invention, in use.
Figure 6B:
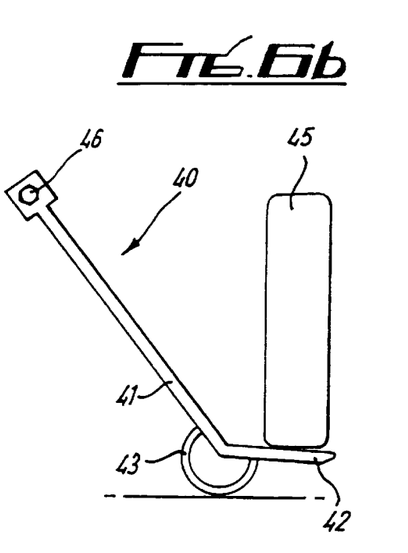
Figure 6C:
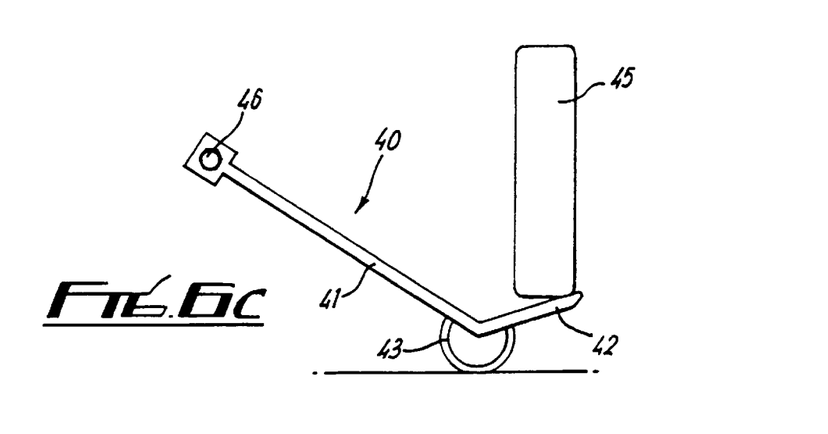
Figure 6D:
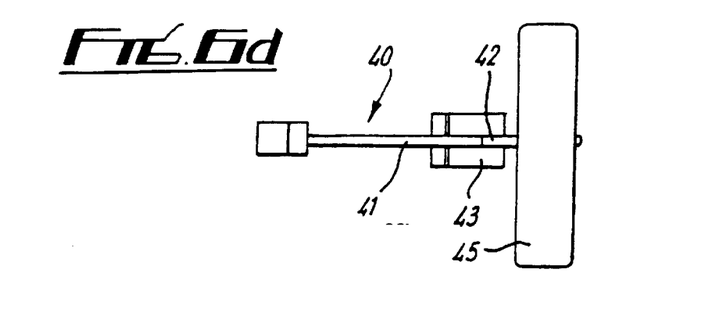
FIG. 6d is a plan view of the device of FIG. 6b.

FIG. 5b shows a spare wheel mount 130 of the type in which first and second wheel mounting studs (of which one 126 is shown) are located on a frame 131, which is in turn mounted on the outside of an off road vehicle (not shown). A mounting plate 132, also shown in FIG. 5c, is provided. The mounting plate 132 is provided with two circular apertures 138A, 138B, adapted to be fitted over the two studs in order to allow a harness to be mounted to the vehicle (not shown) via the studs.

The studs are generally cylindrical and attached to the frame 131 at their first ends. The studs have a threaded portion 134 adjacent their second ends, the remainder of their lengths constituting an unthreaded portion 136. A nut 137 is provided which in use is run up to the interface between the threaded portion 134 and the unthreaded portion 136 in order to restrain a wheel (not shown) mounted on threaded portion of the stud and prevent said wheel from moving on to the unthreaded portion 136. A second nut (not shown) would be provided to retain the wheel on threaded portion 134 of the stud. The mounting plate 132 is retained against the frame 131 by a spacer 135 in the form of a cylindrical tube which surrounds the unthreaded portion 136 of the stud and is retained by the nut 137.

The mounting plate is provided with first and second slot-like apertures 139A, 139B each adapted to receive an end portion of the strap portions 110A, 110B of the harness 101, the end portion comprising coupling means in the form of said plurality of sewn loops 104A, 104B. In use each coupling means 104A, 104B is retained in a respective slot-like aperture 139A, 139B by means of a removable retaining pin 133, which has dimensions too large to pass through the apertures 139A, 139B.

It is appropriate to use a mounting plate and loop and pin coupling means where it is, for some reason, not appropriate to use the type of attachment members 4A, 4B shown in FIG. 1. This may be because the shape of the frame 131 makes it inappropriate to have the strap portions 10A, 10B, 110A, 110B extending from so close to the studs. Mounting plates of various shapes and configurations may be provided in order to enable a wheel handling device to be coupled to and used with any of a number of different off road vehicles with different spare wheel mounting stud and spare wheel mounting frame configurations.

It can be seen that these embodiments of the first aspect of the present invention provide vehicle wheel handling devices which greatly facilitate the mounting and demounting of off road vehicle wheels from external rear spare wheel mountings, enabling wheels to be lowered and lifted much more easily than previously and also providing restraining means to prevent a wheel rolling or bouncing away, even if dropped. Furthermore, it can be seen that a variation of this embodiment may be used to facilitate the mounting or de-mounting of a vehicle wheel which is internally mounted in, for example, a vehicle boot. A device designed for such internally mounted wheels would work on the same principle, having a plurality of handles which, when acted upon sequentially, could effect the mounting or demounting of the wheel. Said wheel would pivot during the mounting or demounting process, thus both providing a mechanical advantage which facilitates the manoeuvring of the wheel and optionally simultaneously wrapping the wheel in at least one cover member provided by the device. Such a device could be attached to the vehicle either via at least one member provided in the vehicle to engage the spare wheel, or by connections provided specifically for attaching such a device.

With reference to FIG. 6a, FIG. 6b, FIG. 6c and FIG. 6d, an embodiment of a vehicle wheel handling device according to the second aspect of the present invention comprises an elongate member 40 having a lever portion 41 and a wheel supporting portion 42, inclined at an angle to said lever portion 41. The wheel handling device also includes a pivot member 43 which comprises an arcuate member attached at its first end to the lever portion 41 and at its second end to the wheel supporting portion 42.

This embodiment of a tire handling device is adapted to facilitate the lifting and fitting of a vehicle wheel 45 onto the studs of an axle hub (not shown). Such a device is useful because when a vehicle has been jacked up in order to allow removal and replacement of a damaged wheel, difficulty may be encountered in lifting the replacement wheel 45 the short distance necessary to place the wheel on the studs.

In use the device is first placed adjacent to the hub onto which the wheel is to be fitted, with the pivot member 43 and the wheel supporting portion 42 of the elongate member 40 engaging the ground, and the lever portion 41 of the elongate member 40 extending upwards at an angle. The wheel 45 is then rolled onto the wheel supporting portion 42 of the elongate member 40 where it is held manually by the operator. The wheel 45 may then be lifted by a selected amount by selectively applying pressure upon the lever portion 41 of the elongate member 40 and pivoting the entire device about the point of contact of the pivot member 43 with the ground. The device provides considerable mechanical advantage allowing even a very heavy wheel to be lifted the short distance to the axle hub studs without undue effort.

As illustrated the pivot member is formed as a portion of a cylinder, which extends axially for some distance on either side of the elongate member providing a line of contact with the ground, for stability. The lever portion 41 may be provided with a socket member 46 for use in loosening or tightening wheel nuts.

Figure 7A:
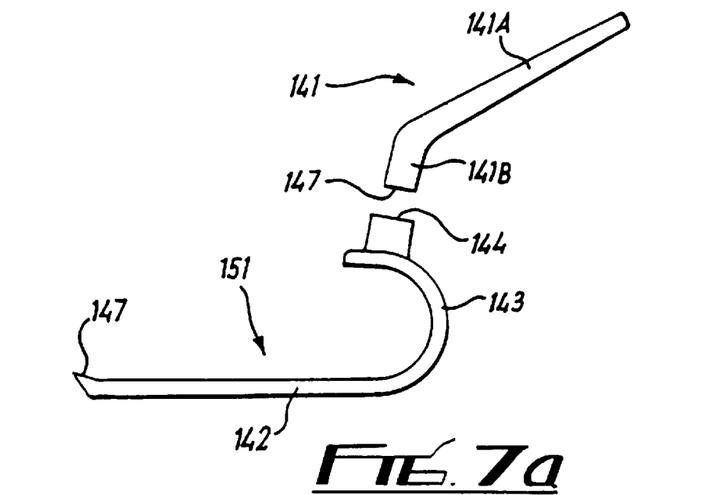
FIG. 7a is a side view of a second embodiment of a vehicle handling device in accordance with the second aspect of the present invention.
Figure 7B:
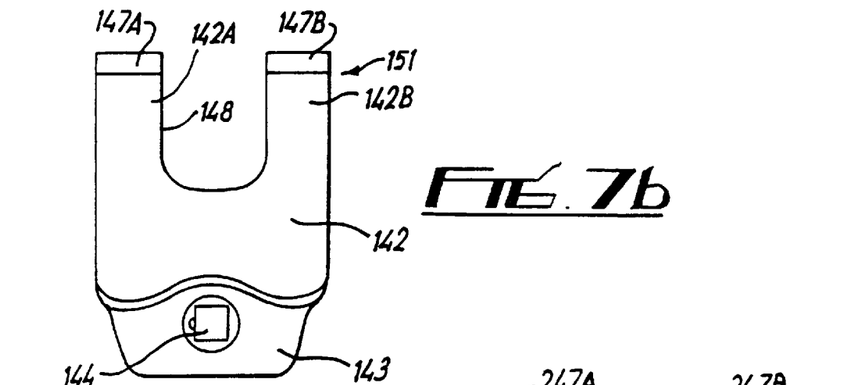

FIG. 7a is a side view of an alternative embodiment of a tire handling device in accordance with the second aspect of the present invention and FIG. 7b is a plan view of a part of the device of FIG. 7a. This embodiment comprises two separate parts: a lever portion 141 and a support and pivot portion 151. The lever portion 141 comprises a longer substantially straight handle portion 141A which may be made any desired length and a shorter inclined portion 141B adjoining, at its first end, the handle portion 141A and terminating, at its second end in a lug 147 which is square in cross section. In a variation of this embodiment the entire lever portion may be square in cross section so that the square lug is formed merely by the termination of the inclined portion 141B.

The support and pivot portion 151 comprises a substantially flat wheel supporting portion 142, and an arcuate pivot portion 143 which extends upwards from a first end of the wheel supporting portion 142 and has, rigidly mounted upon its upper end, a socket 144 adapted to receive the lug 147 of the lever portion 141.

The embodiment of FIGS. 7a and 7b has several advantages over the embodiment of FIGS. 6a to 6d. The lever portion is detachable from the support and pivot portion for easy storage. The wheel supporting portion 142 is substantially flat and is relatively broad reducing the likelihood of the wheel inadvertently falling from the wheel supporting portion during use. The wheel supporting portion 142 also has a cut-out 148 dividing the wheel supporting portion, adjacent its second end, into first and second arms 142A, 142B. This both reduces the weight of the device and further reduces the likelihood of a wheel falling from the wheel supporting portion 142. The wheel supporting portion 142 is also provided with upwardly extending ridge 147 at its second end (or, more specifically with first and second upwardly extending ridges 147A, 147B on its respective first and second arms 142A, 142B. This further reduces the likelihood of inadvertent falling of the wheel during use.

FIGS. 8a, 8b and 8c and 9a, 9b, 9c and 9d show a further embodiment of a wheel handling device in accordance with the second aspect of the present invention. This embodiment has many elements in common with the embodiment of FIGS. 7a and 7b, and these common elements are designated by reference numerals corresponding to the reference numerals used in FIGS. 7a and 7b except that the initial digit in the reference numeral FIGS. 7a and 7b are replaced with the digit 2 in FIGS. 8a, 8b, 8c, 9a, 9b, 9c and 9d.

Figure 8A:
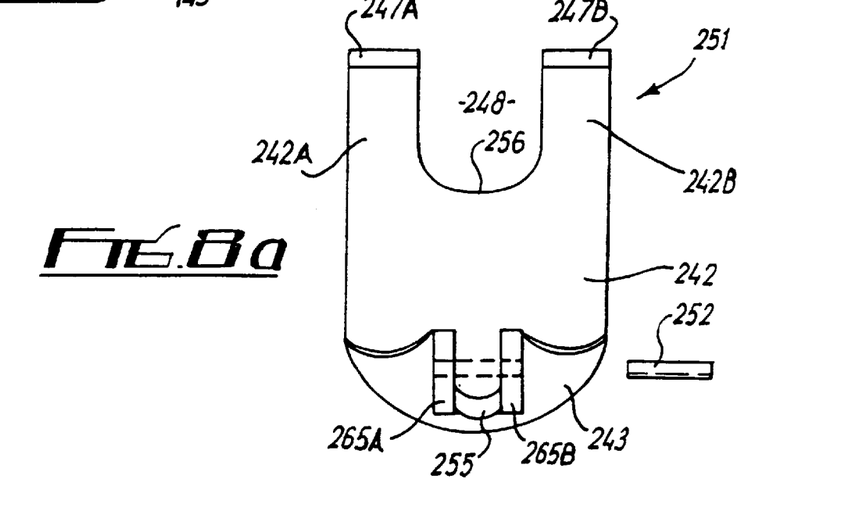
FIG. 8a, FIG. 8b and FIG. 8c show elements of a third embodiment of a vehicle wheel handling device.
Figures 8B, 8C:
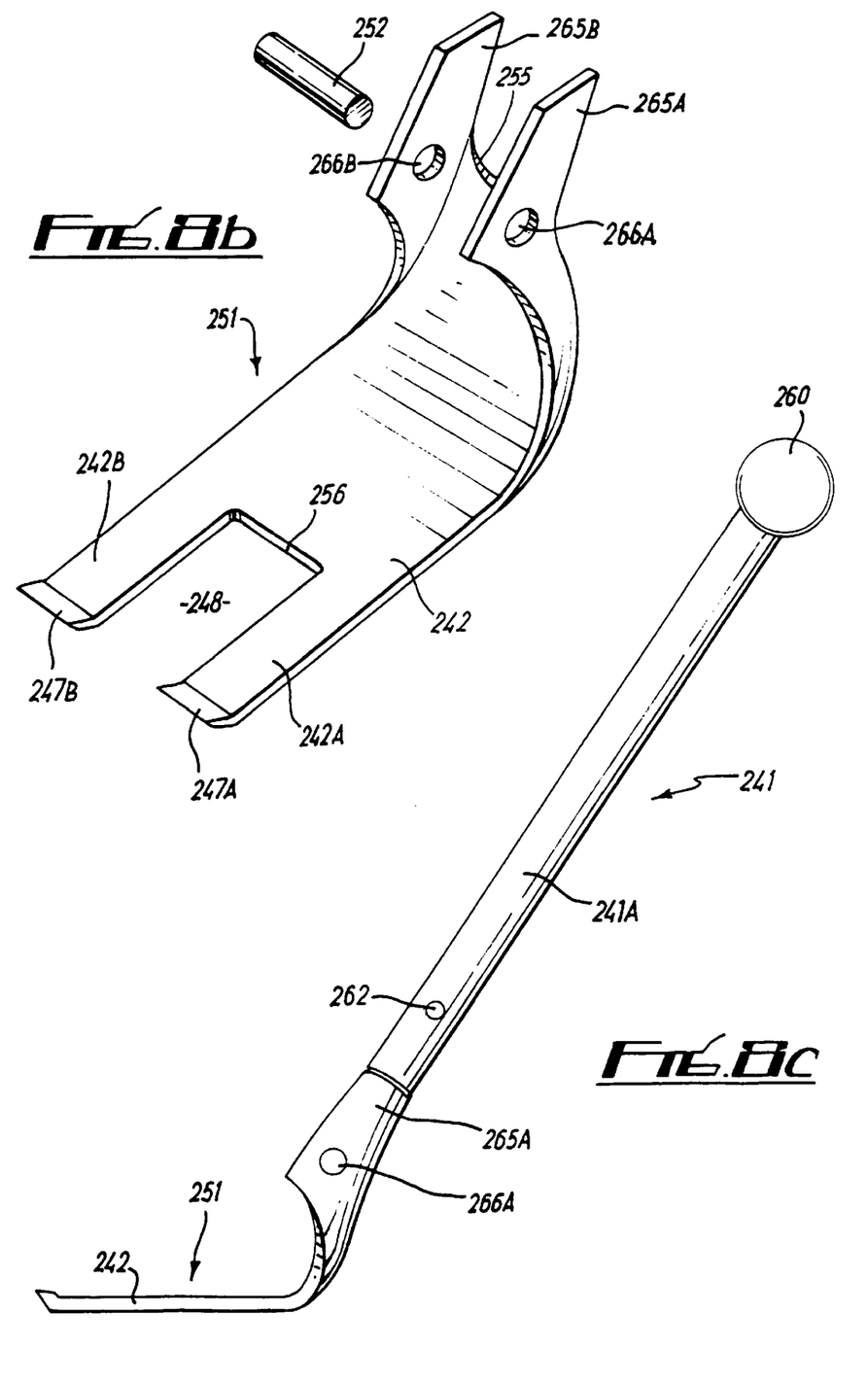

A significant difference between the embodiment of FIGS. 7a and 7b and the embodiment of FIGS. 8a, 8b and 8c is the way in which the lever portion 241 connects to the wheel support and pivot portion 251. The lever portion 241 comprises a substantially straight cylindrical member 241A having a socket 260, adapted for the operation of wheel nuts, at or adjacent a first end thereof, and a through aperture 262 adjacent the second end thereof.

The wheel support and pivot portion 251 is provided with first and second opposed coupling members 265A, 265B which are provided with respective first and second opposed apertures 266A, 266B. The opposed coupling members are spaced apart so as to be able to receive the second end of the lever portion 241 therebetween such that the through aperture 262 is aligned with the first and second opposed apertures 266A, 266B. The opposed coupling members 265A, 265B are mounted on the arcuate pivot portion 243 and a first abutment surface 255 formed by the upper edge of the arcuate pivot portion 243 extends between the first and second opposed coupling members 265A, 265B. A pin 252 is provided which is adapted to fit through the first and second opposed apertures 266A, 266B and the through aperture 262 so as to hingedly couple the lever portion 241 to the wheel support and pivot portion 251. The extent of the relative rotation between the lever portion 241 and the wheel support and pivot portion 251 is limited in one direction by the abutment of the lever portion 241 on the first abutment surface 255 (see the configuration shown in FIG. 9a) and is limited in the other direction by the abutment of the lever portion 241 on a second abutment portion 256 formed by an inner boundary of the cut-out 248 (see the configuration shown in FIG. 9b). Although not clearly shown in the drawings it is evident that the distance between the through aperture 262 and the second end of the lever portion 241 must be small enough to avoid interference of the said second end with the wheel support and pivot member during rotation.

The hinged connection of the lever portion 241 to the wheel support and pivot portion 251 allows compact storage of the device without disassembly. The device can also be used to facilitate the operation of wheel nuts, using the socket 260 attached at the first end of the lever portion 241. Use of the device for this purpose is illustrated in FIGS. 9c and 9d.

Figure 9A:
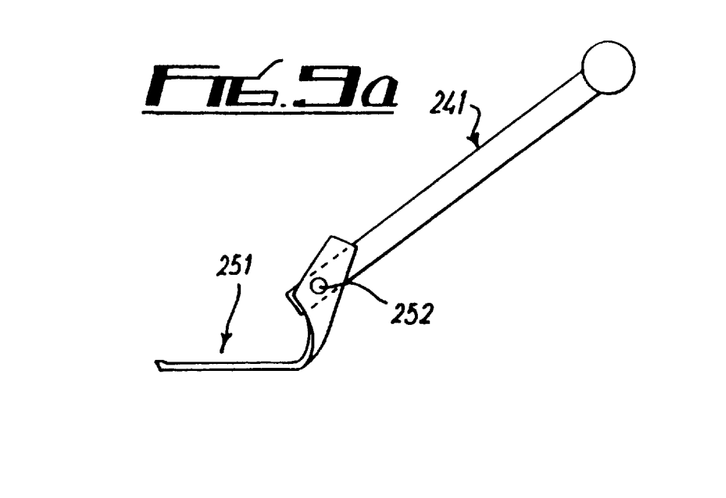
FIG. 9a, FIG. 9b, FIG. 9c and FIG. 9d show different configurations of and illustrate the use of the embodiment of FIGS. 8a, 8b and 8c.
Figure 9B:
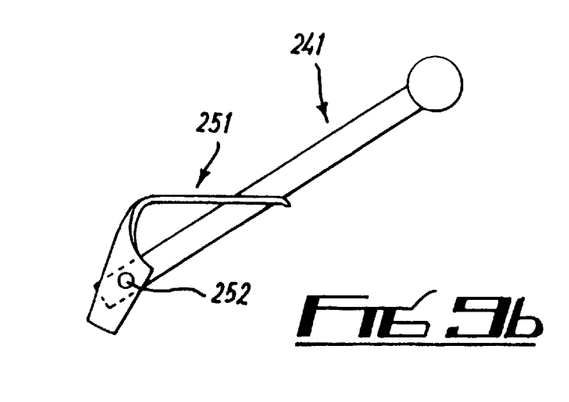
Figure 9C:
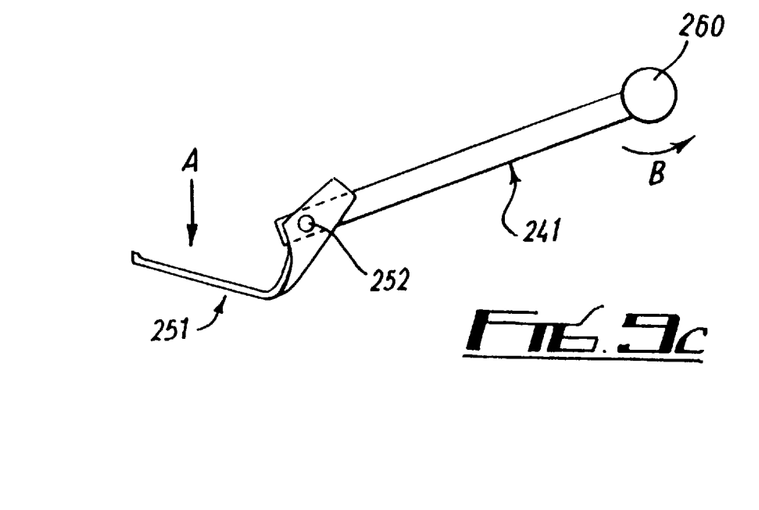
Figure 9D:
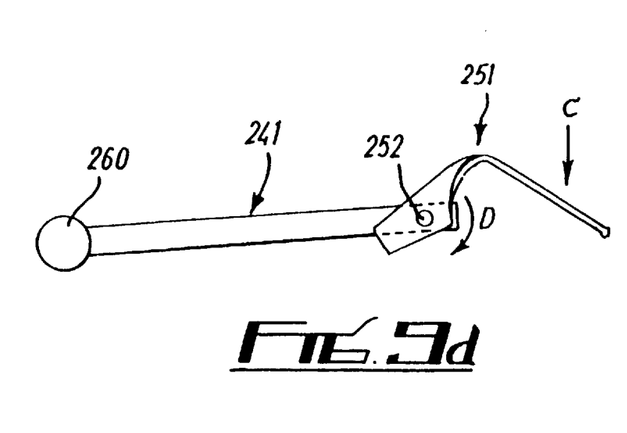

FIGS. 9c and 9d show side views of the device. The aperture of the socket 260 which receives a nut to be operated is not shown because such an aperture is located on the side of the socket which cannot be seen. In use, a wheel nut (not shown) may be undone by fitting the socket over the nut and forcing the device so as to rotate the nut in a counter clockwise direction. Wheel nuts may be very difficult to undo by hand, and the device facilitates operation of the nut by providing a platform in the form of the wheel supporting portion 242 which may be stepped upon, applying a force represented by the arrow A in FIG. 9c in order to provide a considerable counter clockwise torque represented by the arrow B in FIG. 9c. Thus the device facilitates use of the foot in order to undo wheel nuts, by providing a platform upon which to step. This is in contrast to common prior art wheel nut operating tools which are often operated by foot but which are hazardous when used in this way since only a cylindrical bar is typically provided from which a foot may easily slip. The device can also be used to do up wheel nuts but it should be noted that, as illustrated in FIG. 9d, a foot platform is not provided when applying a counter clockwise force to a wheel nut, since if a force represented by the arrow C is applied to the wheel support and pivot portion 251, the wheel support and pivot portion 251 rotates relative to the lever portion 241, as represented by the arrow D. This helps to prevent over-tightening of wheel nuts.

Improvements and modifications may be incorporated without departing from the scope of the invention, for example, mechanised equivalents of elements disclosed may be substituted. A device according to the first aspect of the present invention need not be made from a flexible material but could consist of a number of substantially rigid members connected together.

I claim:

1. A vehicle wheel handling device for assisting in the mounting or demounting of a vehicle wheel onto or from a spare wheel storage position of a vehicle, the device comprising wheel support means comprising an elongate flexible member for supporting the wheel, wherein said wheel support means supports the wheel to permit pivoting of the wheel between a mounted position and a demounted position, coupling means for coupling said device to said vehicle and handle means for allowing manual operation of said device, wherein said coupling means and said handle means are connected to said wheel support means and said device is configured such that raising or lowering of said handle means causes raising or lowering of a wheel supported on said wheel support means, and wherein during at least part of the raising or lowering of a wheel, said device is adapted to cause pivoting of the wheel about a substantially horizontal axis, wherein said pivoting is such that for at least part of the pivoting a first outer part of the wheel remains substantially vertically fixed, whilst a diametrically opposed outer part of the wheel is vertically displaced by a distance substantially equal to twice the diameter of the wheel.

2. A vehicle wheel handling device according to claim 1, wherein said pivoting is effected by raising or lowering of said handle means.

3. A vehicle wheel handling device according to claim 1, wherein said wheel support means permits the wheel to pivot through an angle greater than 90 degrees between said mounted position and said demounted position.

4. A vehicle wheel handling device according to claim 3, wherein the angle is substantially 180 degrees, or is greater than 180 degrees.

5. A vehicle wheel handling device according to claim 1, for use with a vehicle having a spare wheel mounting point and at least one wheel engaging member provided at the spare wheel mounting point, wherein said coupling means includes means for coupling said device to the vehicle via the at least one wheel engaging member provided at the spare wheel mounting point of the vehicle.

6. A vehicle wheel handling device according to claim 1, wherein said device includes retaining means for retaining a wheel in contact with said device.

7. A vehicle wheel handling device according to claim 1, wherein said handle means includes a plurality of handles.

8. A vehicle wheel handling device according to claim 7, wherein said handles are spaced apart along a longitudinal axis of said wheel support member.

9. A vehicle wheel handling device according to claim 7, wherein the device is configured such that consecutive operation of said plurality of handles causes said pivoting of the wheel.

10. A vehicle wheel handling device as claimed in claim 1, comprising a number of substantially rigid members connected together.

11. A vehicle wheel handling device as claimed in claim 1, wherein the elongate flexible member contacts the wheel.

12. A vehicle wheel handling device according to claim 1, wherein said wheel support means is adapted to wrap around the wheel upon said pivoting of said wheel.

13. A vehicle wheel handling device for assisting in the mounting or demounting of a vehicle wheel onto or from a spare wheel storage position of a vehicle, the device comprising wheel support means comprising an elongate flexible member for supporting the wheel, wherein said wheel support means is adapted to wrap around the wheel upon said pivoting of said wheel, and wherein said wheel support means supports the wheel to permit pivoting of the wheel between a mounted position and a demounted position, coupling means for coupling said device to said vehicle and handle means for allowing manual operation of said device, wherein said coupling means and said handle means are connected to said wheel support means and said device is configured such that raising or lowering of said handle means causes raising or lowering of a wheel supported on said wheel support means.

14. A vehicle wheel handling device according to claim 13, wherein said pivoting is effected by raising or lowering of said handle means.

15. A vehicle wheel handling device according to claim 13, wherein during at least part of the raising or lowering of a wheel, said device is adapted to cause pivoting of the wheel about a substantially horizontal axis.

16. A vehicle wheel handling device according to claim 15, wherein said pivoting is such that for at least part of the pivoting a first outer part of the wheel remains substantially vertically fixed, whilst a diametrically opposed outer part of the wheel is vertically displaced by a distance substantially equal to twice the diameter of the wheel.

17. A vehicle wheel handling device according to claim 13, wherein said wheel support means permits the wheel to pivot through an angle greater than 90 degrees between said mounted position and said demounted position.

18. A vehicle wheel handling device according to claim 17, wherein the angle is substantially 180 degrees, or is greater than 180 degrees.

19. A vehicle wheel handling device according to claim 13, wherein said handle means includes a plurality of handles.

20. A vehicle wheel handling device according to claim 19, wherein said handles are spaced apart along a longitudinal axis of said wheel support member.

21. A vehicle wheel handling device according to claim 19, wherein the device is configured such that consecutive operation of said plurality of handles causes said pivoting of the wheel.

22. A vehicle wheel handling device according to claim 13, for use with a vehicle having a spare wheel mounting point and at least one wheel engaging member provided at the spare wheel mounting point, wherein said coupling means includes means for coupling said device to the vehicle via the at least one wheel engaging member provided at the spare wheel mounting point of the vehicle.

23. A vehicle wheel handling device according to claim 13, wherein said device includes retaining means for retaining a wheel in contact with said device.

24. A vehicle wheel handling device as claimed in claim 13, comprising a number of substantially rigid members connected together.

25. A vehicle wheel handling device as claimed in claim 13, wherein the elongate flexible member contacts the wheel.

26. A vehicle wheel handling device for assisting in the mounting or demounting of a vehicle wheel onto or from a spare wheel storage position of a vehicle, the device comprising wheel support means comprising an elongate flexible member for supporting the wheel, wherein said wheel support means supports the wheel to permit pivoting of the wheel between a mounted position and a demounted position, coupling means for coupling said device to said vehicle and handle means for allowing manual operation of said device, wherein said coupling means and said handle means are connected to said wheel support means and said device is configured such that raising or lowering of said handle means causes raising or lowering of a wheel supported on said wheel support means, wherein said handle means includes a plurality of handles.

27. A vehicle wheel handling device as claimed in claim 26, comprising a number of substantially rigid members connected together.

28. A vehicle wheel handling device as claimed in claim 26, wherein the elongate flexible member contacts the wheel.

29. A vehicle wheel handling device according to claim 26, wherein said pivoting is effected by raising or lowering of said handle means.

30. A vehicle wheel handling device according to claim 26, wherein during at least part of the raising or lowering of a wheel, said device is adapted to cause pivoting of the wheel about a substantially horizontal axis.

31. A vehicle wheel handling device according to claim 30, wherein said pivoting is such that for at least part of the pivoting a first outer part of the wheel remains substantially vertically fixed, whilst a diametrically opposed outer part of the wheel is vertically displaced by a distance substantially equal to twice the diameter of the wheel.

32. A vehicle wheel handling device according to claim 26, wherein said wheel support means permits the wheel to pivot through an angle greater than 90 degrees between said mounted position and said demounted position.

33. A vehicle wheel handling device according to claim 32, wherein the angle is substantially 180 degrees, or is greater than 180 degrees.

34. A vehicle wheel handling device according to claim 26, wherein said handles are spaced apart along a longitudinal axis of said wheel support member.

35. A vehicle wheel handling device according to claim 26, wherein the device is configured such that consecutive operation of said plurality of handles causes said pivoting of the wheel.

36. A vehicle wheel handling device according to claim 26, wherein said wheel support means is adapted to wrap around the wheel upon said pivoting of said wheel.

37. A vehicle wheel handling device according to claim 26, for use with a vehicle having a spare wheel mounting point and at least one wheel engaging member provided at the spare wheel mounting point, wherein said coupling means includes means for coupling said device to the vehicle via the at least one wheel engaging member provided at the spare wheel mounting point of the vehicle.

38. A vehicle wheel handling device according to claim 26, wherein said device includes retaining means for retaining a wheel in contact with said device.

\* \* \* \* \*